United States Patent
Corrigan et al.

(10) Patent No.: US 11,891,945 B2
(45) Date of Patent: Feb. 6, 2024

(54) HIGH-PERFORMANCE INTERNAL COMBUSTION ENGINE WITH IMPROVED HANDLING OF EMISSION AND METHOD OF CONTROLLING SUCH ENGINE

(71) Applicant: FERRARI S.p.A., Modena (IT)

(72) Inventors: Dáire James Corrigan, Modena (IT); Michele Di Sacco, Calcinaia (IT); Massimo Medda, Sassuolo (IT); Stefano Paltrinieri, Formigine (IT); Vincenzo Rossi, Genzano di Roma (IT)

(73) Assignee: FERRARI S.p.A., Modena (IT)

( * ) Notice: Subject to any disclaimer, the term of this patent is extended or adjusted under 35 U.S.C. 154(b) by 54 days.

(21) Appl. No.: 16/392,846

(22) Filed: Apr. 24, 2019

(65) Prior Publication Data
US 2019/0323415 A1    Oct. 24, 2019

(30) Foreign Application Priority Data

Apr. 24, 2018   (IT) .......................... 102018000004821

(51) Int. Cl.
*F02B 19/10*    (2006.01)
*F01N 3/20*     (2006.01)
(Continued)

(52) U.S. Cl.
CPC ........ *F02B 19/1023* (2013.01); *F01N 3/2006* (2013.01); *F02P 5/145* (2013.01); *F02P 15/02* (2013.01); *F01N 2430/08* (2013.01)

(58) Field of Classification Search
CPC ............ F02B 19/1023; F02B 2023/085; F02B 19/16; F02B 23/08; F02B 19/12;
(Continued)

(56) References Cited

U.S. PATENT DOCUMENTS 6,055,954 A * 5/2000 Takada .................... F02B 19/12
                                                        123/285
6,311,665 B1 * 11/2001 Yasuoka ............... F02B 23/104
                                                        123/301
(Continued)

FOREIGN PATENT DOCUMENTS

JP          56044417 S       4/1981
JP          61250364 A    *  11/1986
(Continued)

OTHER PUBLICATIONS

Heywood, John B. Internal combustion engine fundamentals. New York: McGraw-Hill, pp. 21-22. (Year: 1988).*

(Continued)

*Primary Examiner* — Scott A Reinbold
(74) *Attorney, Agent, or Firm* — CANTOR COLBURN LLP

(57) ABSTRACT

An internal combustion engine generally includes at least a cylinder; at least an intake valve acting on an intake port for controlling the airflow entering the cylinder; at least an injector for supplying uncombusted fuel to the cylinder; at least an outlet valve acting on a respective outlet port for controlling the flow of the exhaust gases at the outlet of the cylinder; a piston sliding in a linear manner within the cylinder; at least a first spark plug arranged in a position adjacent to the injector and acting within the combustion chamber; a pre-chamber communicating with the combustion chamber; and a second spark plug acting within the pre-chamber; the first spark plug is arranged in an intermediate position between the pre-chamber and the injector.

9 Claims, 6 Drawing Sheets

(51) Int. Cl.
*F02P 5/145* (2006.01)
*F02P 15/02* (2006.01)

(58) Field of Classification Search
CPC .. F02B 19/108; F01N 3/2006; F01N 2430/08; F02P 5/145; F02P 15/02
USPC .................................................. 123/260, 261
See application file for complete search history.

(56) References Cited

U.S. PATENT DOCUMENTS

| | | | |
|---|---|---|---|
| 2006/0213470 A1* | 9/2006 | Maehara | F01L 13/0005 |
| | | | 123/90.16 |
| 2014/0209057 A1 | 7/2014 | Pouring et al. | |
| 2019/0078498 A1* | 3/2019 | Bedogni | F02B 19/1023 |

FOREIGN PATENT DOCUMENTS

| | | | | |
|---|---|---|---|---|
| JP | 61250364 S | | 11/1986 | |
| JP | 09004459 H | | 6/1995 | |
| JP | 2002070558 A | * | 3/2002 | ............... F02B 1/12 |
| JP | 2002070558 A | | 3/2002 | |

OTHER PUBLICATIONS

Misumi et al. English Translation (Year: 1986).*
Search Report issued in EP Application No. 19170931.0-1004, dated Aug. 29, 2019; 7 pages.
International Search Report issued in International Application No. IT201800004821, completed Sep. 24, 2018; 8 pages.

* cited by examiner

# HIGH-PERFORMANCE INTERNAL COMBUSTION ENGINE WITH IMPROVED HANDLING OF EMISSION AND METHOD OF CONTROLLING SUCH ENGINE

CROSS-REFERENCE TO RELATED APPLICATIONS

This Patent Application claims priority from Italian Patent Application No. 102018000004821 filed on Apr. 24, 2018, the entire disclosure of which is incorporated herein by reference.

TECHNICAL FIELD

The present invention concerns an internal combustion engine for a motor-vehicle, with direct fuel injection, in particular a high-performance internal combustion engine for a GT motor-vehicle, with improved handling of emissions.

The present invention furthermore concerns a method for controlling the above-mentioned internal combustion engine.

PRIOR ART

High-performance internal combustion engines for automotive use are known comprising a plurality of cylinders, for example six, eight, ten or twelve, split into two banks which form an angle ranging from 60° to 180° between each other.

The known engines further comprise an intake manifold for each bank, fed with fresh air (combustion agent for the combustion) and in turn connected to the cylinders of the bank by means of respective intake ducts.

Analogously to the intake, the cylinders of each bank are connected to a relative exhaust manifold by means of respective exhaust ducts having the function of expelling the combustion products. Each exhaust manifold then conveys the exhaust gases expelled from its cylinder bank towards a catalytic system for the abatement of the polluting engine emissions.

Each cylinder is further associated with at least one intake valve (normally two twin intake valves) for controlling the airflow entering from the intake manifold and with at least one outlet valve (normally two twin outlet valves) for controlling the outflow of exhaust gases towards the exhaust manifold. Furthermore, each cylinder is associated with an injector to cyclically inject fuel into the cylinder. Each cylinder is coupled with a respective piston, which is adapted to slide in a linear manner along the cylinder and is mechanically connected to a crank shaft by means of a connecting rod.

If the internal combustion engine operates according to the Otto cycle (i.e. powered by petrol or equivalents), each cylinder is also associated with a spark plug for cyclically determining ignition of the mixture formed by fuel and air present inside the cylinder and triggering the combustion reaction.

For each cylinder, the corresponding intake valves and part of the corresponding intake duct (comprising the intake manifold) constitute an intake member which has the function of supplying fresh air to the inside of the cylinder.

Analogously, for each cylinder, the corresponding outlet valves and part of the corresponding exhaust duct (comprising the exhaust manifold) constitute an outlet member which has the function of expelling the exhaust gases from the inside of the cylinder.

The cylinders of each bank are usually obtained inside a base or monoblock; the intake and outlet members associated with each cylinder are instead carried by a head fixed in abutment on the base at an upper axial end of the cylinders.

The piston in reciprocating motion inside each cylinder delimits with the latter and with the head a chamber commonly known as combustion chamber, namely the chamber in which ignition of the mixture formed of the fuel and the air takes place.

Direct injection occurs when the injector feeds the fuel directly into the combustion chamber of the respective cylinder.

A critical point of the known engines is represented by the heating of the catalytic system. In practice, a catalytic system operates effectively only above a certain temperature value, usually above 300-400° C. Until that moment, abatement of the engine emissions is minimum. This is why a large part of the engine emissions in an emission test cycle are recorded before the catalytic system enters the temperature range necessary for effective operation.

A catalytic system would heat up quickly only in the case of a high-power requirement by the vehicle driver. At engine start, on the other hand, the power/torque requirement is low.

To remedy this drawback, strategies have been developed to rapidly heat the catalytic system even without power/torque requirement by the driver.

The first strategy is to increase the flow rate of the air entering the cylinders at the engine start, consequently obtaining a higher flow rate of the exhaust gases flowing out of each combustion chamber. By doing this only, the engine would produce more torque than that required.

A second strategy is therefore adopted, the spark plug associated with each cylinder produces, during each engine cycle, a very delayed spark inside the combustion chamber thus reducing the torque produced by the idling engine and heating the exhaust gases; in this case, the combustion occurs late in each cylinder and therefore the expansion phase (movement of the respective piston between the top dead centre and the bottom dead centre resulting from ignition in the respective combustion chamber) between the end of the combustion and opening of the respective outlet valve/s is reduced. A high flow rate of the exhaust gases is therefore obtained, and a high temperature of the latter which rapidly heat the catalytic system to bring it as quickly as possible to conditions of maximum efficiency.

The problem is that of establishing the entity of the delay in production of the spark, and therefore the beginning of combustion, that can be tolerated by an engine so that the combustion does not become unstable or the air and fuel mixture does not ignite (phenomenon known as misfire).

To obtain an engine that operates well also with a long spark production delay in each cylinder, the strategy commonly known as spark coupled injection has been developed. With this strategy, a small injection of fuel is made in each cylinder just before production of the spark by the spark plug, thus generating turbulence near the spark plug at the critical moment of ignition of the air-fuel mixture. This allows stabilization of the beginning of the combustion, which is the most critical moment for the stability of a positive-ignition engine.

In practice, by adopting this strategy the engine can run with a delayed ignition of the mixture, with greater incoming airflow rate and therefore with greater outgoing exhaust gas flow rate and greater heating of the latter; also the catalytic system is therefore very rapidly heated at engine start-up and the emissions, particularly significant in this phase, can be reduced.

However, for this strategy to work, the injector must be arranged near the spark plug. Since the injector is usually positioned in the centre of the combustion chamber, the spark plug is often positioned beside the latter adjacent to the area of the outlet valve/s.

The engines of the type described above operate very well at start-up and perform well also at full load, namely when high torque/power is required by the vehicle driver.

Nevertheless, the need is felt in the sector to further improve the performance of these engines, especially at full load.

DISCLOSURE OF THE INVENTION

The object of the present invention is therefore to provide an internal combustion engine for a motor-vehicle, which has low emissions of polluting substances in all operating conditions and, at the same time, offers high performance.

According to the present invention an internal combustion engine for a motor-vehicle is provided, as claimed in claim 1.

The present invention also concerns a control method, as claimed in claim 10.

Further preferred embodiments of the present invention are described in the claims dependent on claim 1 and in the claim dependent on claim 10.

BRIEF DESCRIPTION OF THE DRAWINGS

The present invention will now be described with reference to the attached drawings, which illustrate a non-limiting embodiment thereof, in which.

PREFERRED EMBODIMENT OF THE INVENTION

Figure 1:
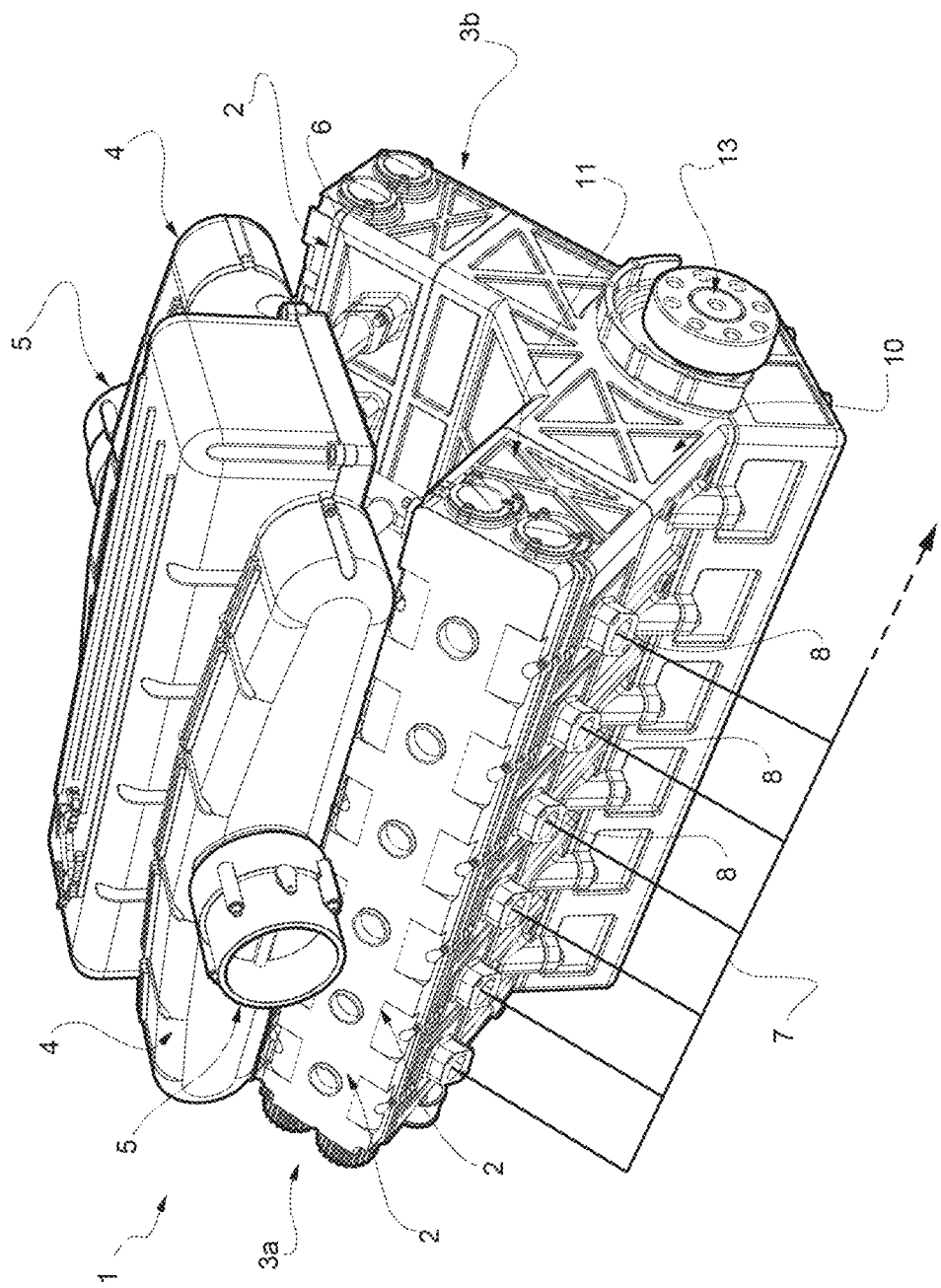
FIG. 1 illustrates, in a perspective view and with parts removed for clarity, an internal combustion engine for a motor-vehicle, produced according to the teachings of the present invention.
Figure 2:
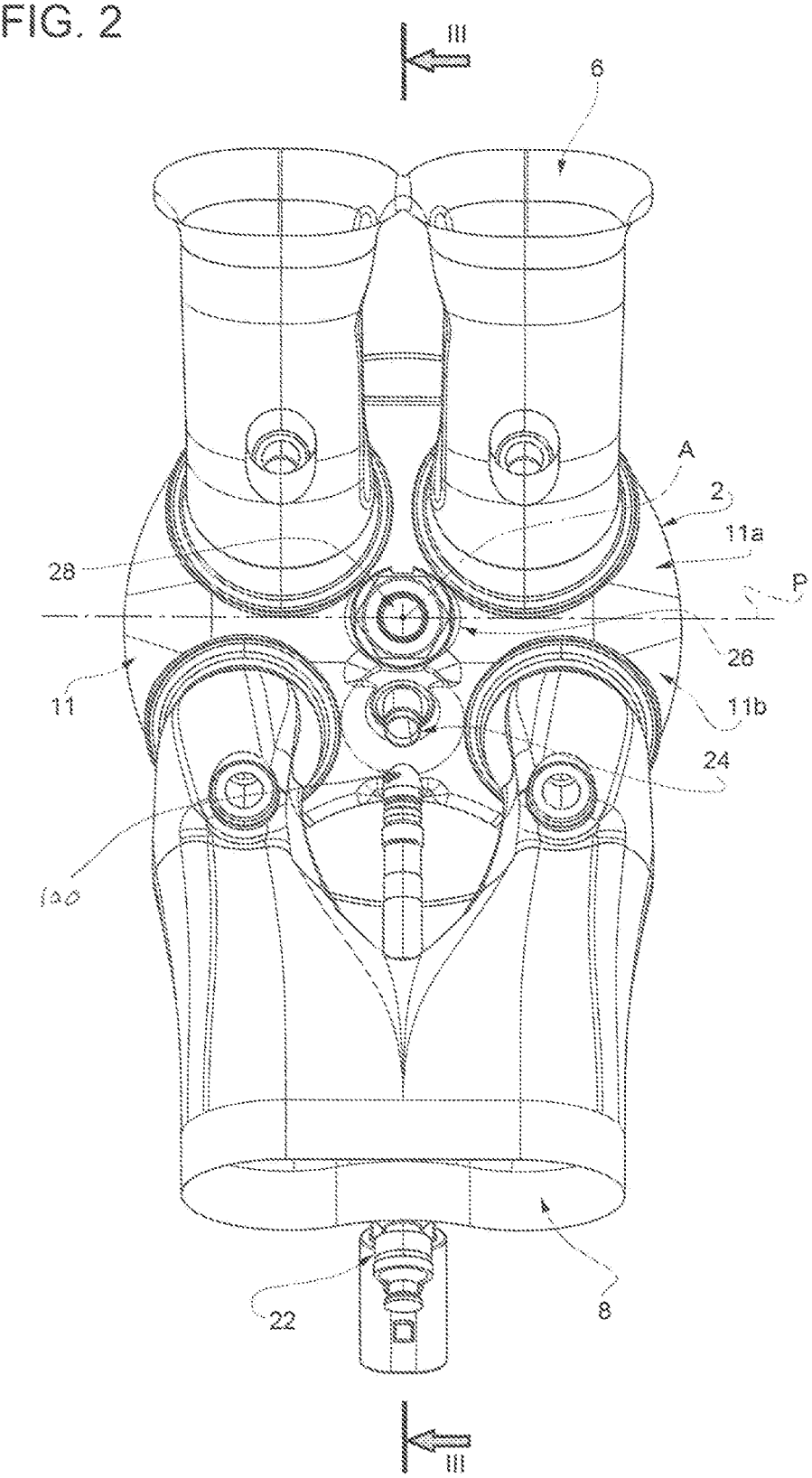
FIG. 2 illustrates in a perspective overhead view and on an enlarged scale, a portion of a head of the engine of FIG. 1, with parts removed for clarity.

In FIG. 1, an internal combustion engine for a motor-vehicle (not illustrated) is indicated overall by 1.

In the case illustrated, the engine 1 comprises twelve cylinders 2 arranged in two banks 3a and 3b which form an angle of 90° between each other. The cylinders 2 of each bank 3a, 3b have respective axes A parallel to each other.

The engine 1 is of the type with direct fuel injection into the cylinders 2 to produce an engine cycle including a fuel combustion reaction by means of air.

The engine 1 is in particular of the high-performance type for a GT motor-vehicle.

According to possible alternatives not illustrated, the engine 1 could comprise a different number of cylinders 2 arranged, again, in two banks, or could comprise one single bank or could comprise one single cylinder.

The angle between the banks could also be different, generally between 60° and 180°.

The engine 1 further comprises, for each bank 3a, 3b:
an intake manifold 4 fed with fresh air through an air intake 5 (in turn connected to an air intake duct known per se and not illustrated) and connected to the cylinders 2 of the bank 3a, 3b by means of respective intake ducts 6; and
an exhaust manifold 7 (known per se and illustrated only schematically in FIG. 1 relative only to bank 3a) connected to the cylinders 2 of the above-mentioned bank 3a, 3b by means of respective exhaust ducts 8 having the function of expelling the combustion products, commonly known as exhaust gases, from the cylinders 2.

Each exhaust manifold 7 then conveys the exhaust gases expelled from the cylinders 2 of its bank 3a, 3b towards a catalytic system, known per se and not illustrated since it is not part of the present invention.

Figure 3:
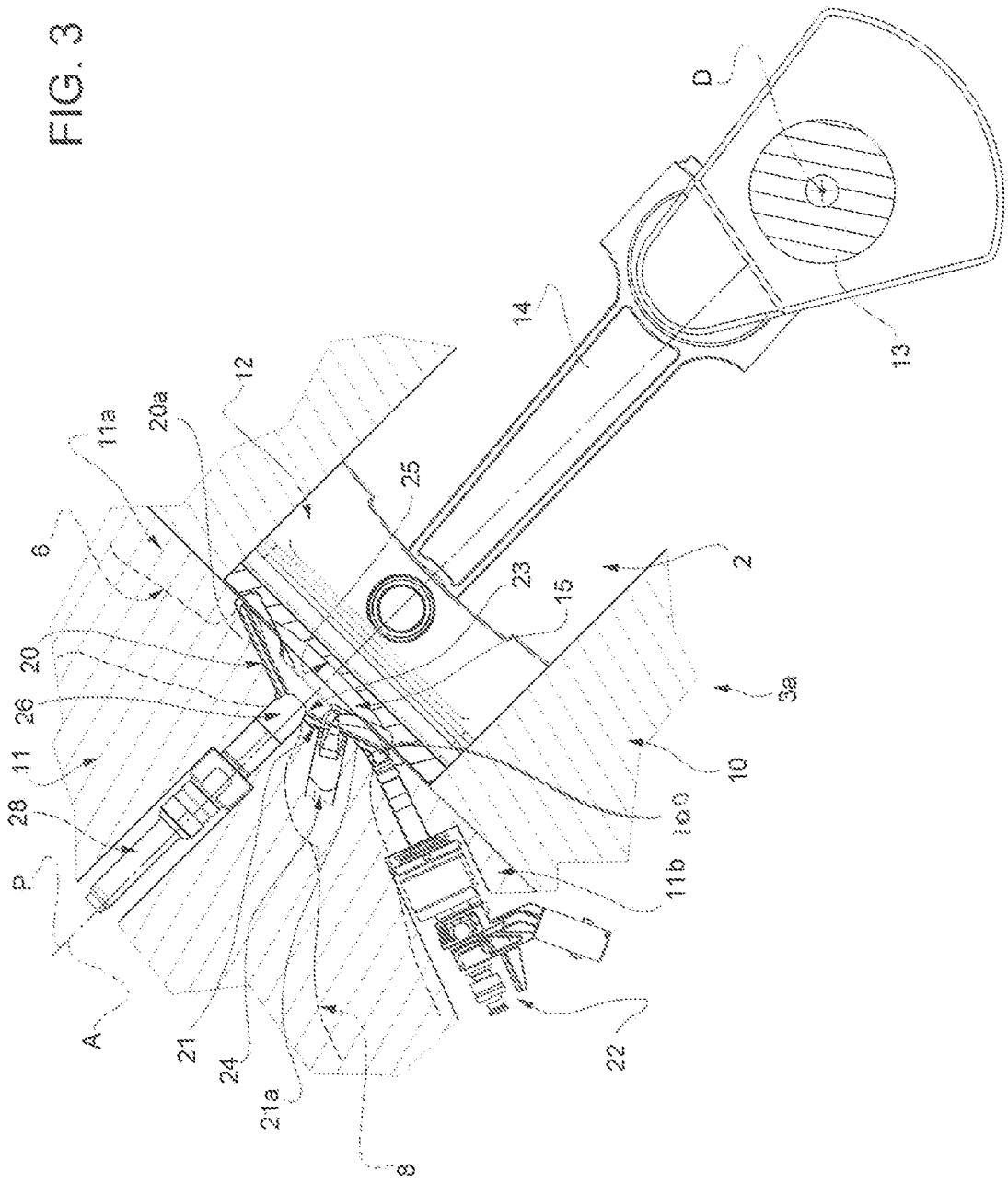
FIG. 3 is a section, on a reduced scale and with parts removed for clarity, according to the line III-III of FIG. 2.

As can be seen in FIGS. 1 and 3, each bank 3a, 3b basically comprises a base 10, inside which the respective cylinders 2 and a head 11 are arranged; the intake ducts 6 and exhaust ducts 8 are obtained inside said head which is fixed in a known manner in abutment on an upper side of the base 10 so as to surmount the upper axial ends of the cylinders 2.

Figure 4:
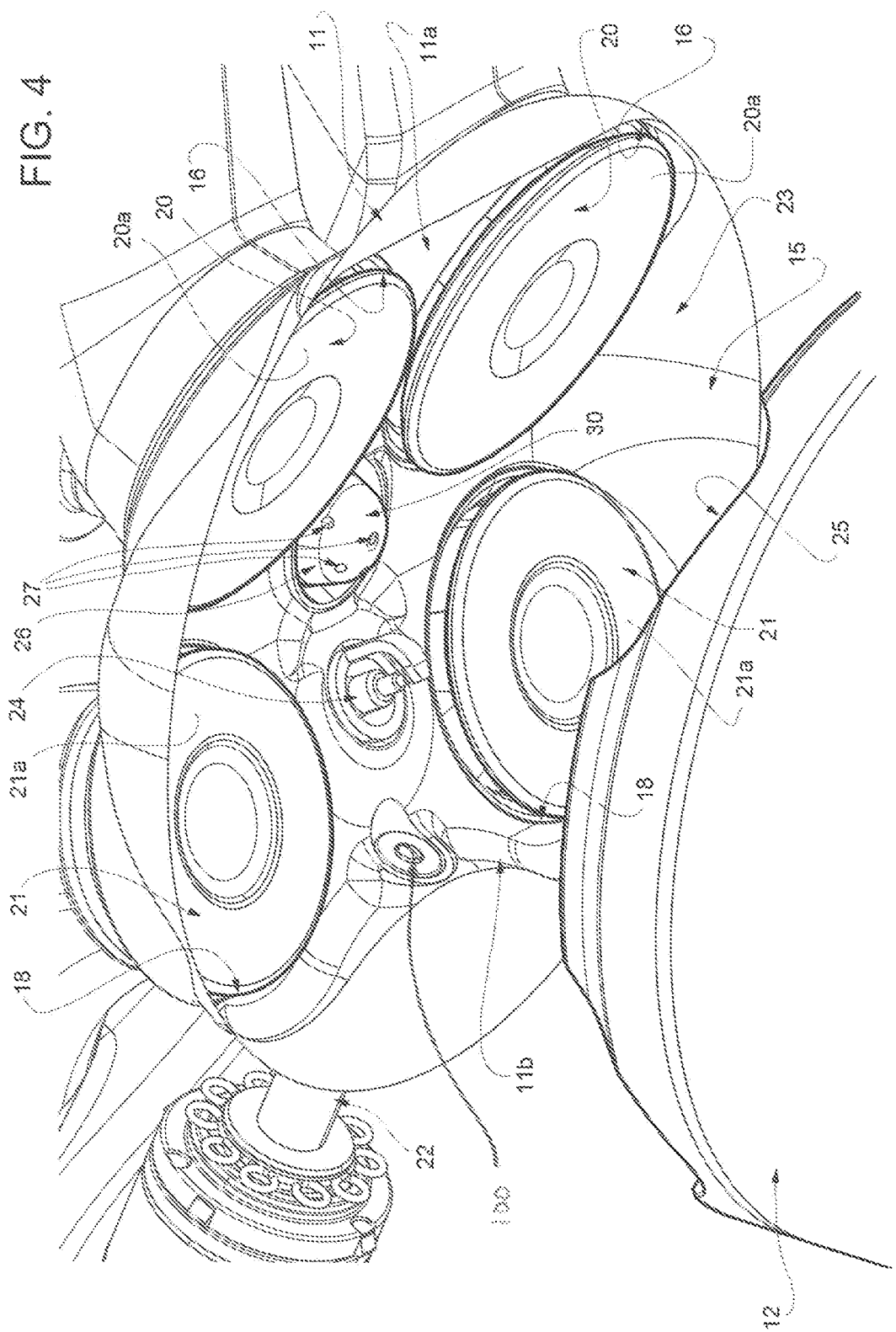
FIG. 4 illustrates, in a perspective view and on an enlarged scale, some internal details of the head of FIG. 2 and of a cylinder of the engine of FIG. 1, with parts removed for clarity.

As can be seen in FIGS. 3 and 4, each cylinder 2 is coupled to a respective piston 12, which is linearly movable along the respective axis A inside the cylinder 2 and is mechanically connected to a crank shaft 13 by means of a respective connecting rod 14 (FIG. 3); as can be seen in FIG. 3, the crank shaft 13 has an axis D orthogonal to the axes A of the cylinders 2 of the two banks 3a, 3b.

With reference to FIGS. 2 to 5, each head 11 delimits, with a respective cylinder 2 and with the piston 12 movable inside the cylinder 2, a relative combustion chamber 15, in which the entire engine cycle is carried out.

The intake ducts 6 and exhaust ducts 8 associated with each cylinder 2 communicate with the respective combustion chamber 15 through at least one intake port 16, in the case illustrated two twin intake ports 16, and at least one outlet port 18, in the case illustrated two twin outlet ports 18.

The airflow entering each combustion chamber 15 is controlled by at least an intake valve 20, in the case illustrated two twin intake valves 20, acting on the respective intake port/s 16.

Analogously, the outflow of the exhaust gases from each combustion chamber 15 is controlled by at least one outlet valve 21, in the case illustrated two twin outlet valves 21, acting on the respective outlet port/s 18.

Each intake valve 20 basically comprises and in a known manner a stem (not illustrated), which moves by sliding in opposite directions within a respective seat (also not illustrated) of the head 11, and a shuttering portion 20a projecting radially from one end of the above-mentioned stem and acting selectively on the respective intake port 16 to close the connection between the respective intake duct 6 and the corresponding combustion chamber 15. Each intake valve 20 receives in a known manner driving forces from a relative control device (known per se and not illustrated since it is not part of the present invention), for example a cam shaft, and is elastically loaded in the closing direction of the connection between the respective intake duct 6 and the corresponding combustion chamber 15.

Analogously, each outlet valve 21 basically comprises and in a known manner a stem (not illustrated), which moves by sliding in opposite directions within a respective seat (also not illustrated) of the head 11, and a shuttering portion 21a projecting radially from an end of the above-mentioned stem and acting selectively on the respective outlet port 18 to close the connection between the respective exhaust duct 8 and the corresponding combustion chamber 15. Each outlet valve 21 receives in a known manner driving forces from the above-mentioned control device and is elastically loaded in the closing direction of the connection between the respective exhaust duct 8 and the corresponding combustion chamber 15.

The engine 1 further comprises, for each cylinder 2, an injector 22 which can be selectively activated to supply uncombusted fuel inside the respective combustion chamber 15.

As can be seen in FIGS. 2, 3, 5 and 6, at each cylinder 2, the respective head 11 is divided by a centreline plane P of the cylinder 2, containing the respective axis A and parallel to the axis D, in:

an intake region 11a including the respective intake port/s 16 and arranged on a side of the centreline plane P; and in an outlet region 11b including the respective outlet port/s and arranged on an opposite side of the above-mentioned centreline plane P.

Advantageously, for each cylinder 2, the respective injector 22 and injector outlet. 100 is mounted in the respective outlet region 11 b of the head 11 in a position adjacent to the respective outlet port/s 18 so that a counterflow of air and fuel is generated in use, adapted to allow effective homogenization of the mixture of the latter.

As can be seen in FIGS. 2 to 5, at each cylinder 2, the respective head 11 is delimited towards the corresponding piston 12 by a concave surface 23 facing the piston 12: due to this type of conformation, the respective intake regions 11a and outlet regions 11b are at least partially facing each other.

Figure 5:
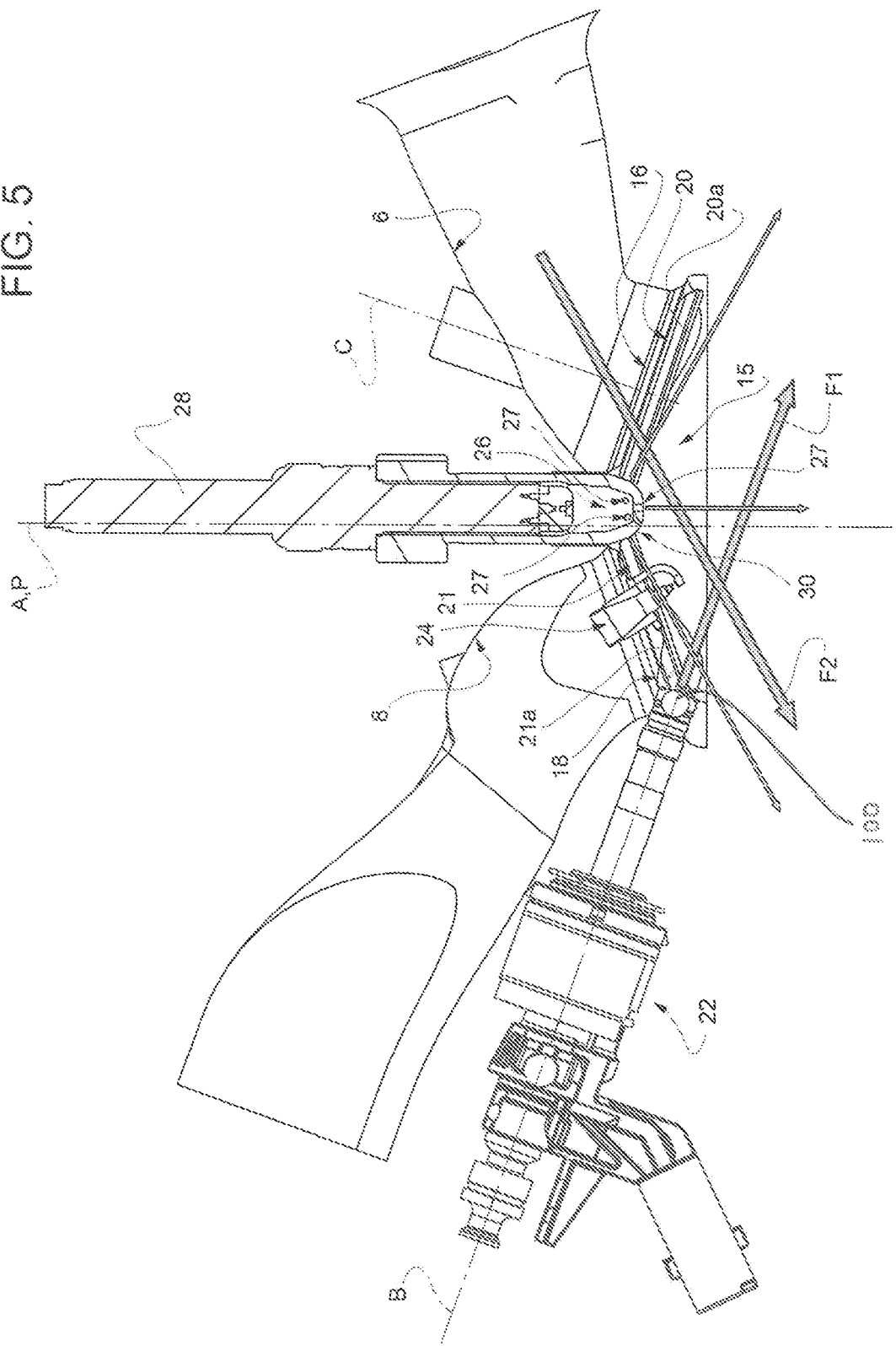
FIG. 5 illustrates, on an enlarged scale and in a side or section view, some details of FIG. 3.
Figure 6:
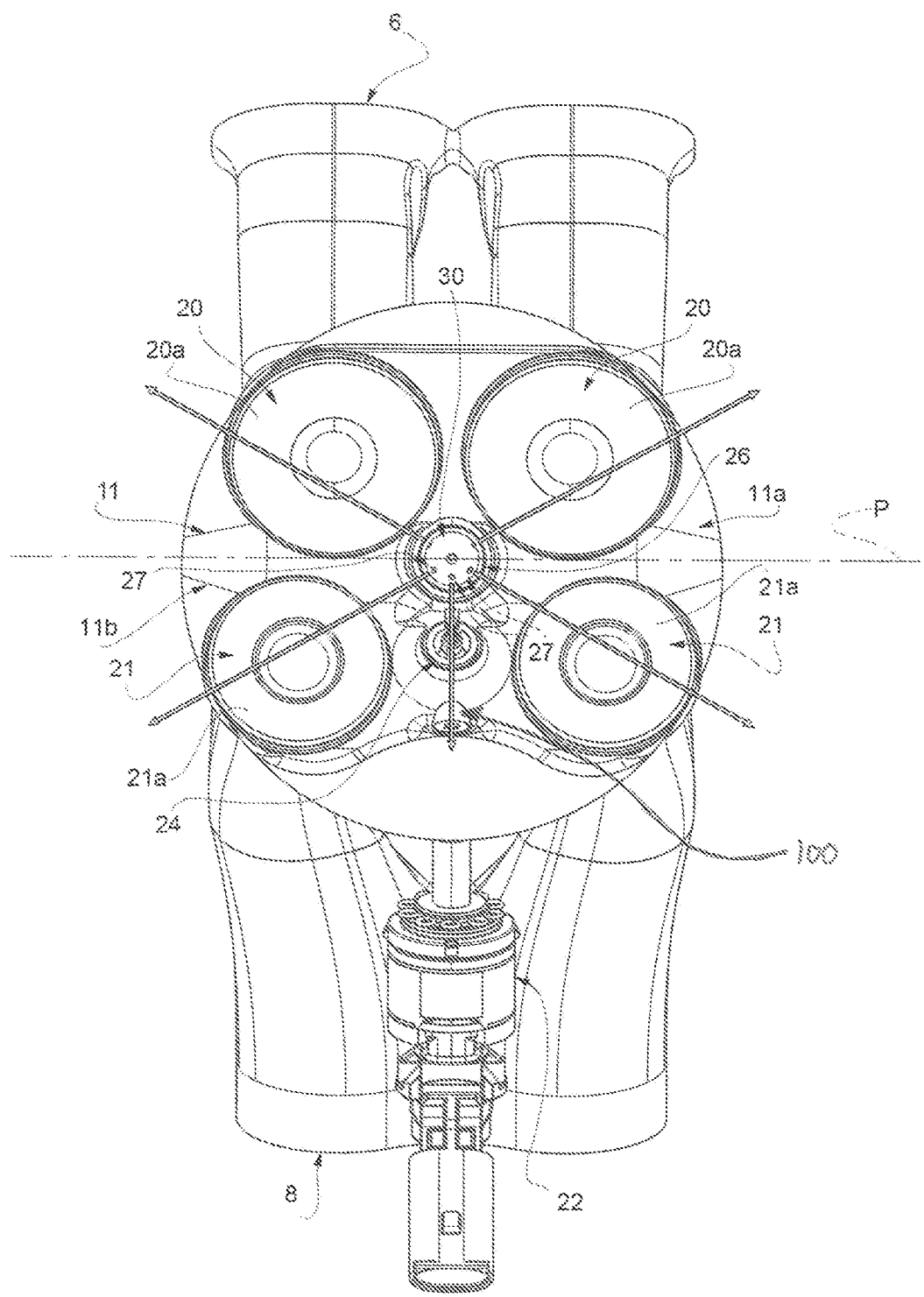
FIG. 6 illustrates, viewed from below and with parts removed for clarity, the portion of the head of FIG. 2.

As shown mot clearly in FIG. 5, each injector 22 via its outlet 100 and each group formed of one of the intake ports 16 and the corresponding intake duct 6 cooperating with said injector 22 are configured to emit respective incoming flows F1, F2 of the fuel and the air, converging towards the centre of the corresponding combustion chamber 15.

If each cylinder 2 is associated with a single intake port 16 and a single intake duct 6, the latter and the corresponding injector 22 are configured to emit respective incoming flows F1, F2 of the fuel and the air, converging towards the centre of the corresponding combustion chamber 15.

In further detail, each injector 22 and each intake port 16 cooperating with said injector 22 have respective axes B, C (FIG. 5) converging towards the centre of the corresponding combustion chamber 15.

As can be seen in FIGS. 3 and 4, each piston 12 has, on an own face facing the head 11, a cavity 2 opposite the respective concave surface 23 and having the function of creating a vortex action on the air flow F1, so that the latter can effectively mix with the fuel injected by the respective injector 22.

In the case illustrated, the engine 1 operates according to the Otto cycle and the fuel used therefore consists of petrol or equivalent products; therefore, each cylinder 2 is also associated with at least a first spark plug 24 for cyclically and selectively determining ignition of the fuel-air mixture present in the respective combustion chamber 15 and for triggering the combustion reaction.

In particular, at each cylinder 2, the spark plug 24 is mounted on the head 11 in a position adjacent to the respective injector 22 and projects inside the respective combustion chamber 15; this close proximity between the injector 22 and the spark plug 24 allows, as seen previously, adoption of the strategy commonly known as spark coupled injection and described previously.

More precisely, the spark plug 24 associated with each cylinder 2 is mounted inside the respective outlet region 11b of the head 11 and in a position adjacent to each outlet port 18 and on one side with respect to the same.

In the example illustrated, the spark plug 24 associated with each cylinder 2 is mounted on the respective head 11 in a position interposed between the two outlet ports 18.

Advantageously, the engine 1 further comprises, for each cylinder 2:

a pre-chamber 26 communicating with the respective combustion chamber 15 through one or more free connection ports or holes 27, i.e. without valves, and fed with a mixture of air and fuel; and a second spark plug 28 projecting inside the pre-chamber 26 for cyclically and selectively determining ignition of the mixture present in the pre-chamber 26 and for triggering the combustion reaction.

As illustrated in FIGS. 2 to 6, each spark plug 24 is arranged in an intermediate position between the respective pre-chamber 26 and the respective injector 22.

In particular, for each combustion chamber 15 and for each cylinder 2, the respective pre-chamber 26, the respective spark plug 24 and the respective injector 22 are arranged along a line transversal to the corresponding axis A.

In the example illustrated, the pre-chamber 26 associated with each combustion chamber 15 is of passive type, namely fed only by the air-fuel mixture present in the combustion chamber 15 during movement of the respective piston 12 towards the respective head 11 with consequent compression of the mixture.

In further detail, each pre-chamber 26 is carried by the respective head 11 substantially in a central position with respect to the corresponding cylinder 2.

Each pre-chamber 26 is delimited towards the respective combustion chamber 15 by a wall 30, preferably convex, projecting inside the pre-chamber 26 and bearing the connection ports 27.

Due to this type of layout, at each cylinder 1, the engine 1 can operate in two different operating conditions:

a particular low load operating condition, i.e. when the IMEPH (Indicated Mean Effective Pressure, High) parameter is lower than 5 bar, for example in the starting phase of the engine 1; and a normal operating condition, in particular at full load, i.e. when the IMEPH parameter is equal to or greater than 5 bar.

As will be explained in further detail below, in the particular operating condition, the majority of the injection of fuel into each combustion chamber 15 is carried out during the intake phase, while a small injection of fuel is delayed and carried out just before production of the spark by the spark plug 24.

Instead, in the normal operating condition, the injection of fuel into each combustion chamber 15 is carried out during intake of the air and the spark is produced in the respective pre-chamber 26 by the respective spark plug 28.

The operation of the engine 1 is described for the sake of simplicity with reference to a single cylinder 2 and therefore to a single combustion chamber 15, it being understood that the description applies to any cylinder 2 of the engine 1.

In particular, during a first intake phase of the engine cycle, the piston 12 moves along the axis A of the cylinder 2 from a top dead centre position, in which the piston 12 is arranged at a minimum axial distance from the head 11, to a bottom dead centre position, in which the piston 12 is arranged at a maximum axial distance from the head 11.

In said phase, the outlet valves 21 are in the closed position of the respective outlet ports 18, while the intake valves 20 move to an opening position of the connection between the intake ducts 6 and the combustion chamber 15 allowing fresh air to enter the latter through the intake ports 16.

If the engine 1 is in the normal operating condition, i.e. at full load, for example during normal running, injection of the fuel into the combustion chamber 15 by the injector 22 is carried out in this phase. Due to the arrangement of the injector 22 at the outlet region 11b of the head 11, the fuel enters the combustion chamber 15 in counterflow with respect to inlet of the air with consequent particularly effective mixing of the air and fuel particles. Furthermore, the presence of the cavity 25 on the piston 12 allows the establishment of a vortex regime of the incoming air with consequent further improvement of the mixing of air and fuel.

At this point, a compression phase of the air-fuel mixture begins, in which the intake valves 20 move to the closed position of the respective intake ports 16 and the piston 12 moves back up from the bottom dead centre position towards the top dead centre position.

The air-fuel mixture compressed by the piston 12 also enters the pre-chamber 26 through the connection ports 27. The ratio between the mass of the air and that of the fuel in said mixture is of the stoichiometric type. However, optimal operation of the engine 1 also with a ratio between the mass of the air and that of the fuel different from the stoichiometric ratio is not ruled out.

The subsequent phase is a phase of expansion of the air-fuel mixture resulting from ignition of the same and takes place with the intake valves 20 and outlet valves 21 in the closed position.

In particular, in the normal operating condition, ignition of the mixture is carried out in the pre-chamber 26 by the spark plug 28; due to the arrangement of the pre-chamber 26 in a central position inside the combustion chamber 15, the flame front begins from the centre of the latter and has a minimum distance to cover to burn all the portions of mixture present in the combustion chamber 15; this translates into a rapid combustion with low detonation risk.

In this phase, due to the combustion reaction, the mixture expands rapidly, determining movement of the piston 12 towards the bottom dead centre.

The final phase of the engine cycle is an outlet phase, in which the outlet valves 21 are moved to the opening position and the piston 12 moves back up from the bottom dead centre to the top dead centre with consequent expulsion of the exhaust gases from the combustion chamber 15.

If the engine 1 is in the particular operating condition, namely at low load, for example during start-up, the airflow entering the combustion chamber 15 during the intake phase is increased and the fuel is injected not only during this later phase but also, to a small extent, just before ignition of the mixture. In particular, the above-mentioned spark coupled injection strategy is adopted, so that ignition of the mixture is carried out by the spark plug 24, positioned adjacent to the injector 22, immediately after the above-mentioned small injection of fuel performed by the latter.

The injection of fuel performed just before production of the spark by the spark plug 24 allows the generation of turbulence near to the spark plug 24 at the critical moment of ignition of the mixture. This allows stabilization of the beginning of the combustion, which is the most critical moment for the stability of the engine 1.

In practice, by adopting this strategy, the engine 1 can run with a delayed ignition of the mixture, with greater incoming airflow rate and therefore with greater flow rate of outgoing exhaust gases and greater heating of the latter; the catalytic system can therefore be heated very rapidly at low load, for example at start-up of the engine 1, and the emissions of polluting substances can be reduced, particularly important in this particular operating condition of the engine 1.

From an examination of the characteristics of the engine 1 and of the control method of the engine 1 carried out according to the teachings of the present invention, the advantages it offers are evident.

In particular, for each cylinder 2, the engine 1 allows:
the spark coupled injection strategy to be maintained active to achieve effective heating of the catalytic system in low load conditions, for example at start-up of the engine 1;
use of the pre-chamber 26, positioned in the centre of the combustion chamber 15, at full load, namely during normal operation of the engine 1, with lower risks of detonation and rapid combustion; and
improvement of homogenization of the air-fuel mixture exploiting the arrangement of the injector 22 in counterflow to the air entering the combustion chamber 15 through the intake port/s 16.

In short, the engine 1 allows high performances to be obtained (due to the presence of a pre-chamber 26 positioned in the centre of each combustion chamber 15) and reduced emissions of polluting substances (due to the arrangement of each injector 22 adjacent to the respective spark plug 24, thus implementing the spark coupled injection strategy at low load, and due to the arrangement of each injector 22 in the outlet region 11b of the head 11 with generation of an air-fuel counterflow during the fuel intake phase).

Lastly, it is clear that modifications and variations can be made to the engine 1 and to the control method of said engine described and illustrated here without thereby departing from the protective scope defined by the claims.

The invention claimed is:
1. An internal combustion engine (1) for a motor-vehicle comprising:
at least one cylinder (2) having a longitudinal axis (A) and adapted to receive fuel and air for carrying out an engine cycle including a combustion reaction of the fuel itself;
at least one intake duct (6) adapted to feed said cylinder (2) with fresh air, through at least one intake port (16);
at least one intake valve (20) acting on said intake port (16) for controlling the airflow entering said cylinder (2);
at least one injector (22) that can be selectively activated to supply uncombusted fuel to said cylinder (2);
at least one exhaust duct (8) communicating with said cylinder (2) through at least one outlet port (18) for removing from the cylinder (2) exhaust gases formed at the end of said combustion;

at least one outlet valve (21) acting on said outlet port (18) for controlling the flow of the exhaust gases at the outlet of said cylinder (2); and a piston (12) mounted in a linearly sliding manner along said longitudinal axis (A) within said cylinder;

wherein said intake port (16), said outlet port (18) and said injector (22) are carried by a head (11) of the internal combustion engine (1), said head (11) being arranged in abutment against an axial end of said cylinder (2) and delimiting with said piston (12) and with the cylinder (2) a combustion chamber (15), wherein said head (11) is divided by a centreline plane (P) of said cylinder (2), containing said longitudinal axis (A) and includes an intake region (11a) including said intake port (16) and arranged on one side of said centreline plane (P); and an outlet region (11b) including said outlet port (18) and arranged on an opposite side of said centreline plane (P); wherein said injector (22) is mounted in said outlet region (11b) of said head (11) in a position adjacent to said outlet port (18), and wherein said injector (22) has an outlet (100) protruding into said combustion chamber to supply uncombusted fuel therein;

said internal combustion engine (1) further comprising:
- at least a first spark plug (24) mounted on said head (11) in a position adjacent to said injector (22) and acting inside said combustion chamber (15) for cyclically and selectively determining the ignition of the mixture formed by fuel and air present in the combustion chamber (15) and for triggering the combustion reaction;
- a pre-chamber (26), delimited towards said combustion chamber (15) by a wall (30), communicating with the combustion chamber (15) through one or more free connection ports (27) and fed with a mixture of air and fuel, and
- a second spark plug (28) projecting inside said pre-chamber (26) for cyclically and selectively producing the ignition of the mixture present in the pre-chamber (26) and triggering the combustion reaction;

said first spark plug (24) being arranged in an intermediate position between said wall (30) of said pre-chamber (26) and the outlet (100) of said injector (22), wherein said first spark plug (24) is in close proximity to the outlet (100) of said injector (22), and wherein the injector (22), first spark plug (24), and the pre-chamber (26) are arranged along a line transversal to longitudinal axis (A); and said pre-chamber (26) is carried by head (11) being arranged at least partially along the centreline (P) at a center of the combustion chamber (15) such that the injector (22) and the first spark plug (24) are offset in their entireties relative to the centreline (P), and wherein the prechamber (26) is configured with the one or more free connection ports in fluid communication with said combustion chamber (15).

2. The engine according to claim 1, wherein said pre-chamber (26) is only fed with the mixture of fuel and air present in said combustion chamber (15) during the movement of said piston (12) towards said head (11) with a consequent compression of the mixture itself.

3. The engine according to claim 1, wherein said pre-chamber (26) is carried by said head (11) in a central position in respect to said cylinder (2).

4. The engine according to claim 1, wherein said pre-chamber (26) is delimited towards said combustion chamber (15) by a convex wall (30) protruding inside said combustion chamber (15) and bearing said one or more connection ports (27).

5. The engine according to claim 1, wherein said head (11) is delimited towards said piston (12) by a concave surface (23) facing the piston (12); and wherein said intake regions (11a) and outlet regions (11b) are at least partially facing one another.

6. The engine according to claim 1, wherein said injector (22) and the group formed by said intake port (16) and by said intake duct (6) are configured to emit inlet flows (F1, F2), respectively of the fuel and the air, converging towards the centre of said combustion chamber (15).

7. The engine according to claim 1, comprising a plurality of said cylinders (2) arranged facing one another in one or more banks (3a, 3b) arranged at an angle to one another when at least two cylinder banks (3a, 3b) are present, a plurality of said combustion chambers (15) and, for each said cylinder (2), at least one said intake port (16), at least one said outlet port (18), at least one said intake valve (20), at least one said outlet valve (21), at least one said injector (22), at least one said pre-chamber (26), at least one said first spark plug (24) and at least a second said spark plug (28) acting inside said pre-chamber (26).

8. A method for controlling an internal combustion engine (1) according to any one of the preceding claims, characterised in that it comprises the steps of:
   - driving said first spark plug (24) in a first operating condition of said engine (1); and
   - driving said second spark plug (28) inside said pre-chamber (26) in a second operating condition of the engine (1) different from said first operating condition.

9. The method according to claim 8, wherein said first operating condition is a particular operating condition of the low load operation of said engine (1), and wherein said second operating condition is a normal operating condition of operation of said engine (1) at full load.

* * * * *